United States Patent [19]
Kruder et al.

[11] 3,992,500
[45] Nov. 16, 1976

[54] VENTED EXTRUDER

[75] Inventors: George A. Kruder; Russell J. Nichols, both of Marion, Ohio

[73] Assignee: Koehring Company, Milwaukee, Wis.

[22] Filed: June 7, 1974

[21] Appl. No.: 477,370

[52] U.S. Cl. .............................. 264/102; 264/349; 425/203; 259/191
[51] Int. Cl.² ...................... B29B 1/04; B29B 1/06
[58] Field of Search ............... 259/9, 10, 191, 193; 159/2 E; 425/203, 208, 812; 264/102, 349

[56] References Cited
UNITED STATES PATENTS

| | | | |
|---|---|---|---|
| 3,023,456 | 3/1962 | Palfey | 159/2 E |
| 3,367,635 | 2/1968 | Gresch | 159/2 E |
| 3,376,603 | 4/1968 | Colombo | 159/2 E |

*Primary Examiner*—Edward L. Roberts
*Assistant Examiner*—Alan Cantor
*Attorney, Agent, or Firm*—Burns, Doane, Swecker & Mathis

[57] ABSTRACT

A rotary screw extruder and a method are provided to both devolatilize and dry plasticized resinous hygroscopic materials during extrusion thereof into a finished product of indefinite length. The extruder includes a screw having three successive pumping sections and a pair of vent sections. Each vent section separates two of the successive pumping sections. The first pumping section meters plasticized material throughflow. The intermediate pumping section has partially full channels that permit a continuous, helical passage to interconnect the two vent sections. The partially full channels establish a free surface which promotes devolatilization and drying. The third pumping section pressurizes the devolatilized and dried plasticized material for extrusion through a conventional die orifice. The devolatilizing and drying method begins by controlling the flow rate of plasticized material into a gas removal zone. The gas removal zone is provided with a flow capacity exceeding the controlled flow rate of plasticized material so that a helical, free surface exists throughout the gas removal zone. Each end of the gas removal zone is connected to a reduced pressure source. The plasticized material is worked as it goes through the gas removal zone to heat the material, to promote drying and devolatilization thereof, and to maintain a uniform flow rate.

15 Claims, 5 Drawing Figures

VENTED EXTRUDER

BACKGROUND OF THE INVENTION

The invention relates generally to rotary screw extruders and methods of extruding hygroscopic synthetic resinous materials. More particularly, the invention is concerned with a rotary screw extruder and a method which devolatilize and dry hygroscopic synthetic resinous materials while the materials are extruded into a finished product thereby eliminating a preliminary dehumidification of the material.

In the past, it has been common to extrude hygroscopic, synthetic resins, such as ABS (acrylonitrile-butadiene-styrene resins), into finished products. However, such extrusion has in the past been preceded by a dehumidifying procedure in which the hygroscopic resins are pre-dried for several hours. When the dehumidifyed resins are extruded through a single vented extruder, a finished product substantially free of pock marks, dimples, streaks, surface roughness, and poor gloss results. A good dehumidification system is not only expensive but also requires a substantial electrical power supply. In addition, the systems occupy valuable floor area in manufacturing operations.

When the hygroscopic resinous material is dehumidified in a hopper dryer, the temperature must be carefully controlled to prevent overheating. Even with careful temperature control, experience has shown an occasional batch of material will become overheated and fuse together causing both loss of time and waste of material.

Another frequent problem with hopper dryers is the difficulty in maintaining uniformly dehumidified material for subsequent use in an extruder. This problem results from the non-homogeneity of moisture content in hygroscopic particulate material.

Previous combinations of a dryer and an extruder have inadequately accommodated the need for rapid color changes often encountered in production operations. The inadequacy results directly from the lead time required to dry a differently colored stock of hygroscopic material for extrusion.

Some rotary screw extruders in the past have employed reduced pressure vent sections to remove volatiles from the extrudate. Typically, however, these vented sections are pressure sealed from one another such as the vented sections of U.S. Pat. No. 2,992,679 which issued to W. W. Twaddle. But, such sealing between sections reduces the effective devolatilization length and is ineffective for use to extrude hygroscopic synthetic resinous materials.

Other extruders have employed continuous devolatilization sections in the extruder screw such as disclosed by U.S. Pat. No. 3,524,222 to Gregory et al. This type of extruder results in nonuniform flow rates which are unsuitable for the extrusion of high quality finished products. Nonuniform flow rates are aggravated by pressure gradients which often occur in long vent sections. Moreover, the extrudate in such extruders frequently develops thermal nonuniformity which is induced by volatile substances undergoing a liquid-vapor phase change. Since viscosity is highly dependent on temperature, such thermal non-uniformity also has an adverse effect on extruded products.

To overcome problems similar to the above, the extruder of the present invention incorporates a varying depth screw in which pumping sections have increasingly greater flow capacities. Such screw design has been used in the past in applications where material is added to the extrudate during extrusion such as illustrated by U.S. Pat. No. 3,287,477 to P. E. Vesilind. Such known screws, however, are used to provide a constant flow rate of extrudate through the extruder and not to provide an efficient means of drying and devolatilizing hygroscopic materials.

It would therefore be desirable to provide a rotary screw extruder which would eliminate problems of the type noted in the extrusion of hygroscopic synthetic resinous materials.

Objects and Brief Summary of the Invention

It is, therefore, a general object of the present invention to provide a novel rotary screw extruder which minimizes or reduces problems of the type previously noted. It is another general object of the present invention to provide a novel method of extruding hygroscopic synthetic resinous material into a finished product without a preliminary dehumidification.

It is a more particular object of this invention to provide a novel rotary screw extruder which accepts hygroscopic material in particulate form and which plasticizes, dries, and devolatilizes the hygroscopic material while it is being extruded in a continuous operation.

It is another object of the present invention to provide a novel rotary screw extruder which mechanically works the plasticized material while it is being devolatilized and dried to maintain a more uniform temperature in the material.

Yet another object of the present invention is to provide a novel rotary screw extruder in which the flow rate of hygroscopic, resinous material is highly uniform throughout the extrusion process.

Still another object of the invention is to provide a novel rotary screw extruder which includes a gas separation zone having an open helical channel which communicates with a source of low pressure at each end.

A further object of the invention is to provide a novel rotary screw extruder for hygroscopic synthetic resinous material which permits rapid color changes in the extruded product.

Yet further, it is an object of this invention to provide a novel rotary screw extruder in which hygroscopic particulate material is uniformly dried during extrusion thereof.

Still further, it is an object of this invention to provide a novel rotary screw extruder which substantially eliminates the waste of hygroscopic material concomitant with occasional overheating of the particulate materials during hopper drying.

yet still further, it is an object of this invention to provide a novel process of extruding hygroscopic, thermoplastic material without the use of a preliminary dehumidification step.

Another object of the invention is to provide a novel method of continuously extruding hygroscopic material which permits rapid color changes and uniformly dries the material.

Yet another object of the invention is to provide a novel extrusion process wherein drying and devolatilization occur throughout a substantial length of the apparatus and wherein the plasticized material is worked in such a manner that a free surface exists throughout the substantial length.

According to a preferred embodiment of the invention, a rotary screw extruder, intended to substantially accomplish the foregoing objects includes a barrel provided with at least two vent openings which are spaced apart axially of the barrel which receives a rotatably mounted screw. One end of the barrel is provided with a conventional die orifice and the other end is provided with an opening through which particulate materials may be supplied to the rotatable screw. The screw includes a first pumping section which receives the particulate material from the feed section and which plasticizes the particulate material and controls the rate of flow of the material through the extruder device. The screw includes a second pumping section downstream of the first pumping section which has a flow capacity greater than the flow capacity of the first pumping section. Between the first and second pumping sections is a vent section which communicates with one of the radial vent openings of the extruder barrel. Downstream of the second pumping section is a third pumping section which has a flow capacity that exceeds the flow capacity of the second pumping section. Between the second and third pumping sections a second vent section is provided which is aligned with the second radial vent opening of the extruder barrel. A reduced pressure source is connected with the radial vent openings of the extruder barrel and thus creates a reduced pressure section over a substantial length of the extruder barrel. Since the second pumping section's flow capacity is greater than the flow capacity of the first pumping section, the material being pumped through the second pumping section does not completely fill the channels of the screw. Accordingly, a continuous passage interconnects the two vent sections within the extruder barrel.

BRIEF DESCRIPTION OF THE DRAWINGS

Other objects and advantages of the present invention will become apparent to those skilled in the art when the appended claims are read in connection with the following detailed description and the accompanying drawings wherein like reference numerals have been applied to like elements and wherein:

DESCRIPTION OF THE PREFERRED EMBODIMENT

Figure 1:
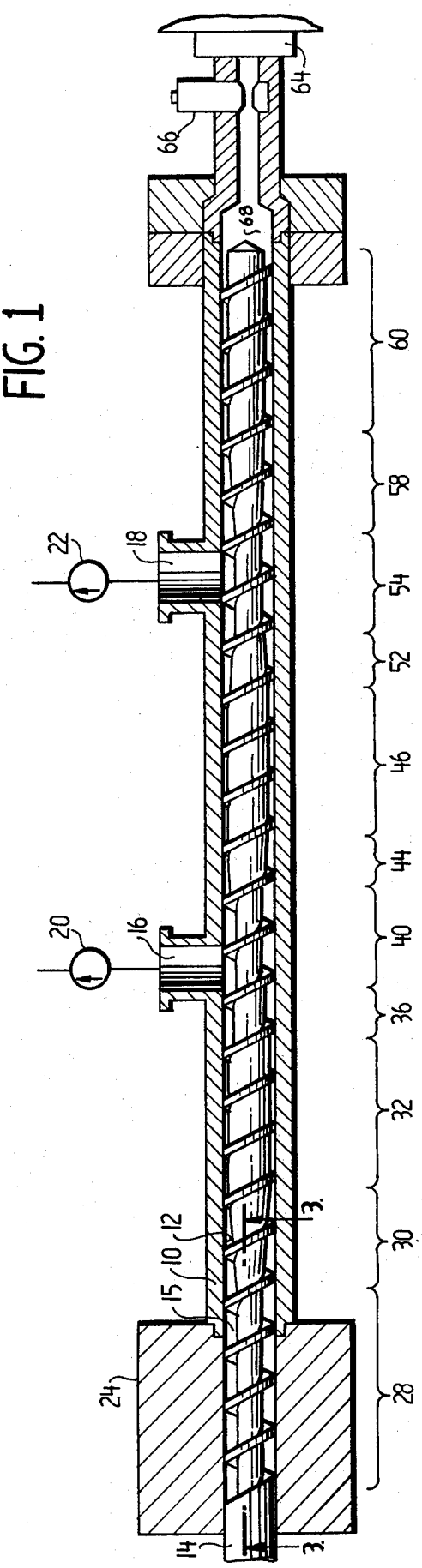
FIG. 1 is a partial cross-section view of a preferred embodiment of a vented extruder.

Illustrated in FIG. 1 is a rotary screw extruder which includes a generally cylindrical barrel 10 having a coaxial, cylindrical bore 12 running longitudinally therethrough. Disposed within the bore 12 is a rotary screw 14. In the illustrated embodiment, the rotary screw 14 has a constant pitch and a substantially-continuous helical channel 15 whose depth varies along the length therefore. (See FIG. 2).

Returning to FIG. 1, the generally cylindrical barrel 10 is preferably provided with at least two generally radial vent openings 16, 18 which are horizontally disposed to prevent condensate from dripping back into the bore 12. Each radial opening 16, 18 may comprise a cylindrical bore which perpendicularly intersects the bore 12 for fluid communication therewith. The first and second radial openings 16 and 18 may be connected to suitable evacuating means, such, for example, as pump means 20, 22.

One end of the barrel 10 may be connected to a conventional supply 24 which may include, for example, a generally cylindrical feed opening 26. (FIG. 3) The feed opening 26 intersects a coaxial bore extension 27 of the generally longitudinal bore 12 and provides communication with a feed section 28 (see FIG. 1) of the rotary screw 14. Within the feed section 28, the depth 29 of the helical channel 15 is preferably uniform and constant (see FIG. 2). Preferably the length of the feed section 28 lies between 5 and 8 times the diameter of the screw 14. The overall length of the screw 14 may be in the neighborhood of 36 times the diameter thereof.

Figure 2:
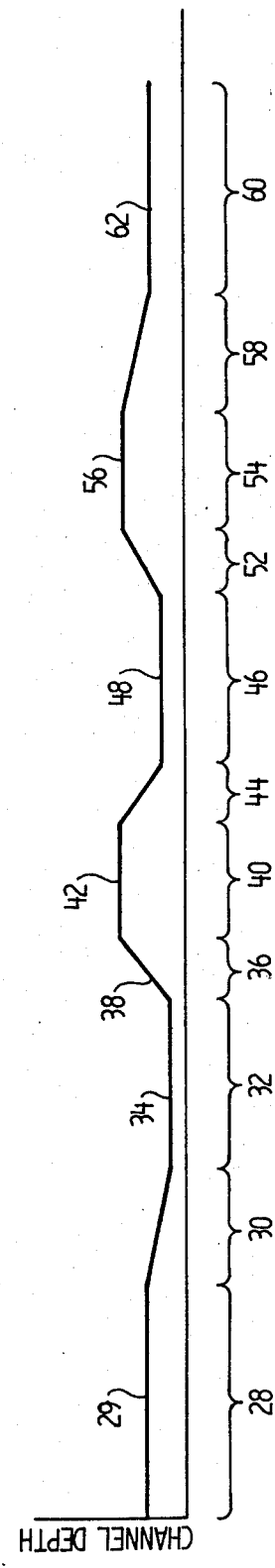
FIG. 2 is an illustration of the variation of channel depth along the length of the screw.
Figure 3:
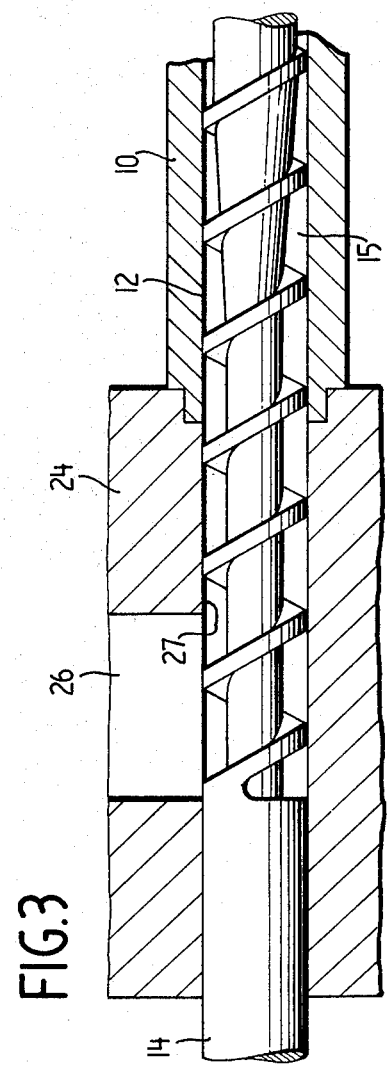
FIG. 3 is a partial cross-sectional view taken along line 3—3 of FIG. 1.

Downstream of the feed section 28, as depicted in FIG. 1, a transition section 30 may be provided in which the depth of the helical channel 15 uniformly decreases in a downstream direction (see FIG. 2). Typically the length of the transition section 30 (FIG. 1) may lie between 3 and 4 times the diameter of the screw 14. The transition section 30 is disposed between the feed section 28 and a first pumping section 32 having a length lying within the range of 4 to 6 times the diameter of the screw.

From FIG. 2 it will be apparent that the depth 34 of the helical channel 15 in the first pumping section 32 is substantially less than the depth 29 of the helical channel in the feed section 28. To those skilled in the art, it will be apparent from classical equations for estimating flow capacity of extruder screws that the flow capacity of the feed section 28 is substantially greater than the flow capacity of the first pumping section 32 by virtue of the different depths 29, 34.

In a conventional manner, synthetic resinous material may be introduced in particulate form into the feed opening 26 of the hopper portion 24. The resinous material is compressed, compacted and plasticized as it moves through the feed section 28 and the transition section 30 and then enters the first pumping section 32. Due to the different flow capacities of the feed section 28 and the first pumping section 32, the plasticized material completely fills the cross-sectional area of the helical channel 15 within the first pumping section 32. In this respect, the first pumping section 32 effectively comprises both a metering section which controls or limits the throughflow rate of plasticized synthetic resinous material and a pressure seal which separates the upstream and downstream portions of the screw.

Figure 4:
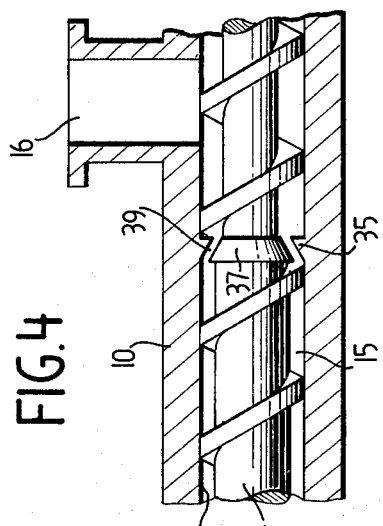
FIG. 4 is a partial cross-sectional view illustrating an alternate embodiment of the invention.

While flow rate metering in the first pumping section 32 may be effected by the flow capacity of the first pumping section 32 per se, it should be apparent that flow metering might also be obtained by disposing a conventional barrier device at the downstream end of the first pumping section 32. (See FIG. 4) The barrier device may comprise, for example, a ring 35 connected to the barrel 10 and a coaxially disposed disc 37 connected to the screw 14. A flow metering orifice 39 is defined between the ring 35 and the disc 37 and controls the flow rate of plasticized material from the first pumping section 32.

Returning to FIG. 1, a relatively short decompression section 36 is preferably provided downstream of the first pumping section 32 to allow a rapid release of pressure developed within the plasticized material by the first pumping section 32. The depth 38 of the helical channel 15 in the decompression section 36 rapidly increases to facilitate the decompression of the plasticized material (see FIG. 2). Typically the decompression section 36 may have a length approximately equal to the diameter of the screw 14 such that the transition of the channel depth 38 occurs in approximately one revolution of the screw 14. Since the throughflow of plasticized material is metered by the first pumping section 32, it may be observed from FIG. 5 that the helical channel 15 is only partially filled in the decompression section 36.

The screw 14 preferably includes a first venting section 40 downstream of the decompression section 36 (FIG. 1) which has a depth 42 (see FIG. 2) substantially greater than the depth 34 of the helical channel 15 in the first pumping section 32. As shown in FIG. 1, an upstream portion of the vent section 40 is disposed adjacent the first radial vent opening 16. Preferably the first venting section 40 extends along a few deep flights of screw 14 and has a length which is 2 to 5 times the diameter of the screw 14. As in the case of the decompression section 36, the helical channel 15 in the first vent section 40 is not completely filled by the plasticized material (see FIG. 5). There, the plasticized material being conveyed through the extruder by the rotary screw 14 includes a free, or exposed surface, 41 within the partially filled channel 15.

It is a known phenomenon in the extruder art that plasticized material accumulates along the leading edge 49 of a screw flight and leaves a space 50 between the conveyed material and the trailing edge 51 of the screw flight (see FIG. 5 at 50) when the flow capacity of the screw exceeds the rate of flow of plasticized material therethrough. This phenomenon gives rise to the free surface 41 which is illustrated in the first venting section 40.

From the first venting section 40, the plasticized material is conveyed by the screw 14 through a relatively short transition section 44 having a length which is approximately equal to the screw diameter and having a uniformly decreasing depth (see FIG. 2). At the downstream end of the transition section 44, the channel depth will correspond to the depth 48 of a second pumping section 46 which is disposed downstream thereof.

The depth 48 of the channel 15 in the second pumping section 46 lies between 1.14 and 2.0 times the channel depth 34 of the first pumping section 32 and preferably lies in the range of 1.33 to 1.50 times the channel depth 34. The length of the second pumping section 46 is preferably in the range of 3 to 6 times the diameter of the screw and in any event should be in the range of 2 to 6 times the screw diameter.

In order that the helical channel 15 in the second pumping section 46 will remain only partially filled throughout the second pumping section (see FIG. 5), the depth 48 must be selected such that the flow capacity of the second pumping section 46 exceeds the flow capacity of the first pumping section 32. One consideration in the selection of the depth 48 is the maintenance of a uniform flow rate for plasticized material through the second pumping section 46. For this purpose, the depth 48 should be as small as possible. To promote effective working which depends on the amount of shearing work performed on the plasticized material, another consideration is to keep the channel 15 in the second pumping section 46 as full as possible while still maintaining the flow capacity requirements.

Downstream of the second pumping section 46 (FIG. 5) the screw 14 is provided with another decompression section 52 which is followed by a second venting section 54. Similarly to the first venting section 40, the channel depth 56 in the second vent section 54 is substantially greater than the channel depth 48 in the second pumping section 46 (see FIG. 2). An upstream portion of the second vent section 54 is disposed adjacnet the second radial opening 18 of the barrel 10 (see FIG. 5). The length of each section 52, 54 generally corresponds to the length of the similar sections 36, 40 of the screw 14.

It should now be apparent that by virtue of the flow capacity of the second pumping section 46, the helical channel 15 includes a helical space 50 which interconnects the first radial vent opening 16 and the second radial vent opening 18 along the interior of the bore 12 even while the plasticized material is being conveyed by the screw 14.

A third transition section 58 is preferably provided downstream of the second venting section 54 to convey material to a third pumping section 60. The third transition section 58 is preferably short and typically might have a length approximately 1 or 2 times the diameter of the screw. The depth of the channel 15 in the third transition section uniformly decreases (see FIG. 2) to the depth 62 of the third pumping section 60.

The third pumping section 60 is designed such that the depth 62 of the helical channel 15 is greater than the depth 48 in the second pumping section 46 and is substantially less than the depth 56 of the second venting section 54. From the well-known equations for extruder drag flow, it will be apparent that the drag flow capacity of the third pumping section 60 substantially exceeds the drag flow capacity of the second pumping section 46. Accordingly, at least the upstream flights of the third pumping section 60 will not be completely filled. Generally the length of the third pumping section 60 will lie between 4 and 8 times the diameter of screw 14.

Connected to the downstream end of the barrel 10 may be an extrusion die 64, as partially illustrated in FIG. 1, which includes an orifice to shape plasticized materials into a finished extruded product. Between the end of the barrel 10 and the extrusion die 64, a conventional valve 66 may be provided to control both the flow and the pressure of plasticized material emanating from the extruder barrel 10.

The third pumping section 60 conveys plasticized material forwardly through the barrel 10 to a chamber 68 at the downstream end of the screw 14. As noted, the pressure of plasticized material in the chamber 68 is controlled by the valve 66. Accordingly, plasticized material accumulates in the chamber 68 and generates a pressure flow of plasticized material upstream through the helical channel 15 of the third pumping section 60. By virtue of this pressure flow, the downstream flights of the third pumping section 60 run full and the remaining flights of the third pumping section 60 run progressively more empty. Pressure increases within the chamber 68 cause an increase in the length of that portion of the third pumping section 60 where the helical channel 15 runs completely full.

Figure 5:
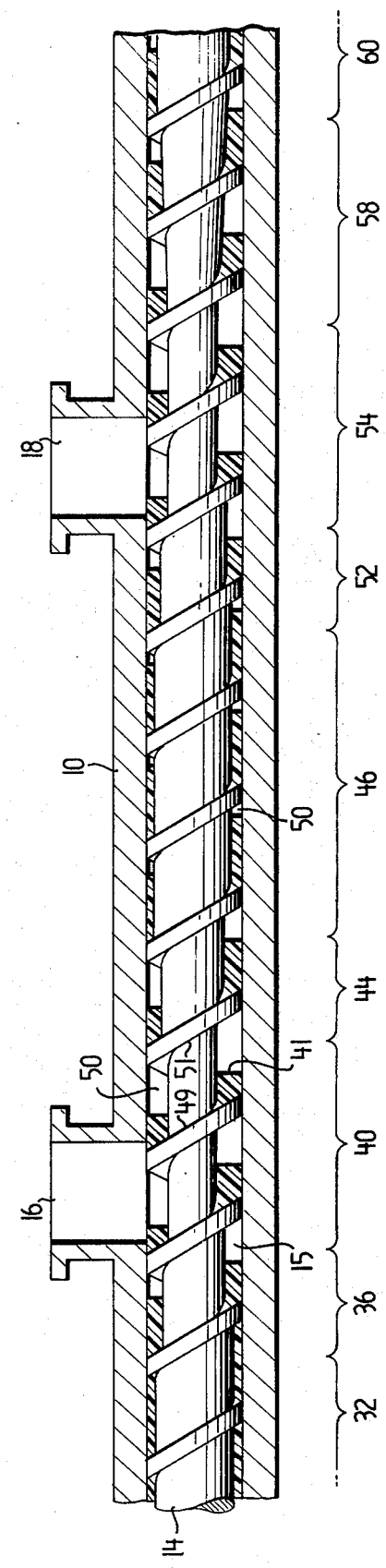
FIG. 5 is an enlarged view in partial cross section which illustrates plasticized material in the screw channel.

Drying and devolatilization of the plasticized hygroscopic material occurs in a gas separation zone of the screw 14 between the decompression section 36 and the third pumping section 60 (see FIG. 5). The gas separation zone is limited at the upstream end by the pressure seal created by the full helical channel 15 in the first pumping section 32. The downstream end of the gas separation zone is limited by the pressure seal effected by the full helical channel 15 of the third pumping section 60.

As noted, the channel 15 in the second pumping section 46 is not completely full and the space 50 provides a continuous helical channel interconnecting the two spaced apart radial vent openings 16, 18. With each radial opening 16, 18 connected to its respective reduced pressure means 20, 22, a reduced pressure will exist throughout the entire gas separation zone which comprises a substantial length of the extruder. Since the plasticized material is continually being worked in the second pumping section 46 the free surface 41 of the plasticized material therein continually exposes new material to the reduced pressure existing in the helical channel 15 [of the second pumping section 46].

Exposure to reduced pressure over a substantial length of the screw 14, both devolatilizes and dries the plasticized material. According to the well-known physical phenomenon, as liquids undergo a liquid-to-vapor phase-change heat is absorbed. This heat absorption can lead to a substantial cooling of the plasticized material being extruded and a consequent deleterious effect on the finished product. Since working of the plasticized material in the vapor removal zone is effective to generate heat, the second pumping section 46 provides a means to replenish the heat otherwise lost to the latent heat of vaporization during the liquid-vapor phase-change of volatiles removed from the plastic.

In operation, a suitable source of reduced pressure is connected to each radial vent opening 16, 18. Hygroscopic resinous material in particulate form is introduced into the feed opening 26 of the hopper portion 24 of the extruder. The particulate material then enters the feed section 28 of the extruder screw 14. The extruder screw 14 conveys the hygroscopic material longitudinal through the bore 12 of the extruder barrel 10. The hygroscopic material moves from the feed section 28 into a transition section 30 and thence into a first pumping section 32. During this movement, the hygroscopic material is compressed, compacted and plasticized. The plasticized, hygroscopic material completely fills the helical channel 15 in the first pumping section 32. Accordingly, the first pumping section 32 both meters the flow of plasticized material and creates a pressure seal between upstream portions of the screw 14 and downstream portions thereof.

From the first pumping section 32, the plasticized and pressurized hygroscopic material enters a decompression section 36 wherein the internal pressure developed by the first pumping section 32 is released. The decompressed and metered flow of plasticized material is then discharged from the decompression section 36 into the first vent section 40 of the screw. In the downstream portion of the decompression section 36 and in the first vent section 40, the plasticized material is exposed to the reduced pressure.

After the short vent section, the plasticized material enters the second transition section 44. From the second transition section 44, plasticized material is conveyed by the screw 14 and into the second pumping section 46. The second pumping section 46 is provided with a flow capacity which exceeds the flow capacity of the first pumping section 32. Accordingly, the helical channel 15 of the second pumping section 46 is only partially filled by the plasticized material. As a result, a continuous helical channel interconnects the two spaced apart radial vents 16, 18. As the plasticized material moves through the second pumping section 46, it is worked in the partially-filled channel. The working kneads the plasticized material to expose vapor pockets therein and to generate thermal energy. Pumping action of the second pumping section 46 promotes a steady and uniform flow of the plasticized material through the extruder which is necessary to maintain a continuous helical passage connecting the two radial vent openings 16, 18.

From the second pumping section 46, the plasticized material enters the second decompression section 52 while being discharged into the second vent section 54. The screw 14 conveys the plasticized material from the second vent section 54 into the third transition section 58 which supplies the devolatilized, dried, plasticized material to the third pumping section 60. The third pumping section 60 operates against the back pressure of plasticized material in the chamber 68 at the forward end of the screw. Moreover, the third pumping section 60 pressurizes the plasticized material flowing therethrough and provides a pressure seal for the downstream end of the reduced pressure region. The third pumping section 60 creates the pressure necessary to express the devolatilized, dried, plasticized material through a shaping orifice at the downstream end of the rotary screw extruder.

As described above, the present invention envisions the normal use of both vents. In some instances, however, it may be possible to operate the system with the first vent opening 16 plugged and the second vent opening 18 connected to a highly efficient pump.

During tests, an extruder designed in accordance with this invention consistently extruded ABS material having a moisture content at least as low as the moisture content in an extrudate resulting from hopper drying of ABS feed stock and subsequent extrusion in a single vented extruder.

Thus, it will be observed that there has been provided in accordance with the invention, a rotary screw extruder which substantially satisfies the objects and advantages set forth above. Although the present invention has been described in conjunction with specific embodiments thereof, it is evident that many alternatives, modifications, variations and equivalents will be apparent to those skilled in the art in light of the foregoing disclosure of the invention. Accordingly, it is expressly intended that all such alternatives, modifications, variations and equivalents which fall within the spirit and scope of the invention as defined in the appended claims be embraced thereby.

What is claimed is:

1. A rotary screw extruder for removing volatiles from a synthetic resinous material throughflow comprising:

a barrel having a generally cylindrical bore and a plurality of generally radial openings therethrough communicating with said bore, said openings being spaced apart axially of said barrel;

a screw rotatably mounted in said bore, said screw having root portions spaced radially inwardly from the interior surface of said bore and spaced apart from each other by generally helical screw flight portions extending into proximity to said surface of said bore, said root portions and said screw flight portions in any given axially extending portion of said screw defining the material flow capacity of that section, said screw including a first pumping section having root portions and screw flight portions defining a first flow capacity operable to pressurize and meter the material throughflow;

a first vent section downstream of said first pumping section and communicating with the first one of said radial openings, said first vent section having root portions and screw flight portions defining a second flow capacity that is substantially greater than said first flow capacity;

a second pumping section downstream of said first vent section and having root portions and screw flight portions defining a third flow capacity exceeding said first flow capacity but less than said second flow capacity;

a second vent section downstream of said second pumping section and communicating with a second one of said radial openings, said second vent section having root portions and screw flight portions defining a fourth flow capacity substantially greater than said third flow capacity; and a third pumping section downstream of said second vent section for discharging material from an end of said bore and for creating a pressure seal downstream of said second vent section; and means connected to said first and second radial openings for creating reduced pressure in said first vent section, said second vent section and said second pumping section.

2. The extruder of claim 1 wherein:
the downstream end of said first pumping section includes a throughflow limiting barrier.

3. The extruder of claim 1 wherein:
said screw includes a feed section having root portions and screw flight portions defining a flow capacity which substantially exceeds said first flow capacity and being positioned upstream of said first pumping section; and wherein
said screw flight portions and said root portions in said first pumping section provide a single channel having a cross-sectional area which is filled by and which meters the throughflow of said first pumping section.

4. The extruder of claim 1 wherein:
said third pumping section has a flow capacity exceeding said third flow capacity and substantially lower than said fourth flow capacity.

5. Extruder apparatus for receiving hygroscopic resinous material in particulate form, plasticizing such material, removing volatiles from the plasticized material, and extruding the plasticized material continuously through a die to form a shaped product of indefinite length, said apparatus comprising:

a barrel having a generally cylindrical bore therethrough, a feed opening at one end and a plurality of generally radial vent openings therethrough, said feed opening and said plurality of generally radial openings each communicating with said bore and each being spaced apart axially of said barrel;

a screw having a helical channel along the length thereof and being rotatably mounted in said cylindrical bore, said screw including:

a feed section at one end for receiving plastic material in particulate form from said feed opeining;

a first pumping section downstream of said feed section having a channel depth of a first predetermined value such that the helical channel cross section is completely filled by the flow of plasticized material through said first pumping section;

a first vent section downstream of said first pumping section and communicating with a first of said plurality of radial vent openings;

a second pumping section downstream of said first vent section having a channel depth of a second predetermined value which lies between 1.14 and 2.0 times said first predetermined value, such that the helical channel cross section in said second pumping section is only partially filled by the flow of plasticized material;

a second vent section downstream of said second pumping section, and communicating with a second of said plurality of radial vent openings; and a final pumping section downstream of the last of said plurality of radial vent openings; having a channel depth greater than said second predetermined value; and extrusion die means for shaping the flow of plasticized material, said extrusion die means communicating with the end of said barrel remote from said feed opening and being disposed downstream of said final pumping section.

6. The extruder apparatus of claim 5 wherein:
said screw includes one helical channel along the full length thereof.

7. The extruder apparatus of claim 6 wherein:
the depth of said helical channel in said second pumping section comprises a second predetermined value which lies between 1.33 and 1.5 times said first predetermined value.

8. The extruder apparatus of claim 7 wherein:
the length of said screw is approximately 36 times the diameter thereof;
the length of said first pumping section is between 4 and 6 times the diameter of said screw;
the length of said second pumping section is between 2 and 6 times the diameter of said screw;
the length of said final pumping section is between 4 and 8 times the diameter of said screw.

9. A process for removing volatiles from synthetic resinous material flowing through a rotary screw extruder comprising:
metering the flow rate of pressurized synthetic resinous material into one end of an elongated gas removal zone extending along the length of the rotary screw;
pressure sealing both ends of the gas removal zone;
connecting a source of reduced pressure to each end of the gas removal zone;
working the synthetic resinous material helically flowing through the gas removal zone in at least one region located between the ends of the gas removal zone; and
providing the gas removal zone with a flow capacity exceeding said metered flow rate to ensure that a helical free surface exists throughout said gas removal zone so that gas liberated upon the working of the synthetic resinous material may be drawn off by the source of reduced pressure.

10. A method devolatilizing and drying hygroscopic resinous plastic material while extruding such material to form a shaped product of indefinite length, said method comprising:

feeding the plastic material in particulate form into one end of a rotary screw extruder;

plasticizing the particulate plastic material in a first pumping section;

metering the rate of flow of plasticized material through the first pumping section while concurrently creating a pressure seal in the first pumping section;

decompressing the flow of plasticizing material;

working the plasticized material in a partially-filled second pumping section having a continuous helical channel adjacent the plasticized material, said working being effective to generate thermal energy in the plasticized material and to promote a uniform flow of plasticized material;

discharging the plasticized material from the second pumping section into a vent section;

pressurizing the plasticized material in a third pumping section which simultaneously functions as a second pressure seal;

exposing the continuous helical channel to reduced pressure by connecting the vent section with a reduced pressure source; and expressing the pressurized, devolatilized and dried material through a shaping orifice at the outlet end of the rotary screw extruder.

11. A rotary screw extruder for removing volatiles from a synthetic resinous material throughflow comprising:

a barrel having a generally cylindrical bore and a plurality of generally radial openings therethrough communicating with said bore, said openings being spaced apart axially of said barrel;

a screw rotatably mounted in said barrel, conforming to said cylindrical bore for advancing a throughflow of synthetic resinous material axially through said barrel, and having an external screw flight with a substantially uniform pitch and screw root portions of different diameters to provide a helical channel, the depth of which varies along the length of said screw, said screw including a first pumping section operable to pressurize and meter the material throughflow and having a first channel depth, a first vent section downstream of said first pumping section, communicating with one of said radial openings and having a second channel depth substantially greater than said first channel depth, a second pumping section downstream of said first vent section having a third channel depth greater than said first channel depth and substantially less than said second channel depth, a second vent section downstream of said second pumping section, communicating with a second one of said radial openings and having a fourth channel depth substantially greater than said third channel depth, and a third pumping section downstream of second vent section, operable to discharge the throughflow from an end of said bore, and to create a pressure seal downstream of said second vent section; and means connected to said first and second radial openings for creating reduced pressure in said first vent section, throughout the axial length of said second pumping section, and in second vent secton.

12. The extruder of claim 11 wherein said third channel depth is 1.14 to 2.0 times said first channel depth.

13. The extruder of claim 12 wherein said third channel depth is 1.33 to 1.5 times said first channel depth.

14. The extruder of claim 13 wherein said second pumping section has an axial length in the range of 3 to 6 times the diameter of said screw.

15. The extruder of claim 11 wherein said third pumping section has a fifth channel depth which is greater than said third channel depth and substantially less than said fourth channel depth.

* * * * *